United States Patent Office

3,838,070
Patented Sept. 24, 1974

---

3,838,070
STABILIZATION OF IRON CATALYSTS
William E. Thomas, Jr., Orange, Tex., assignor to E. I. du Pont de Nemours and Company, Wilmington, Del.
No Drawing. Filed Apr. 21, 1972, Ser. No. 246,424
Int. Cl. B01j 11/22
U.S. Cl. 252—472                              9 Claims

---

ABSTRACT OF THE DISCLOSURE

A method of stabilizing an iron hydrogenation catalyst which exhibits pyrophoric behavior on exposure to an oxygen-containing gas which comprises treating the iron catalyst with an aqueous solution of a stabilizing agent of the group consisting of sorbitol, succinic acid and tetra-(hydroxyethyl)ethylenediamine. The stabilized catalyst can subsequently be washed substantially free of stabilizing agent and reactivated for hydrogenation by treating with hydrogen at an elevated temperature and pressure. Alternately the stabilized catalyst can be washed with substantially anhydrous ammonia and used directly for further hydrogenation of adiponitrile.

---

BACKGROUND OF THE INVENTION

One of the problems attending the use of iron hydrogenation catalysts, particularly in recovering the catalyst from the reactor especially in large-scale operation is the tendency for the catalyst to become pyrophoric on exposure to an oxygen-containing gas such as air. It is known to deactivate or stabilize such catalysts by treating the catalyst bed with steam or by feeding the bed with gas-containing controlled amounts of oxygen. Such procedures tend to be time consuming and not well suited to operations wherein rapid removal and recharging of a catalyst bed is required. Also, rapid oxidation particularly where high temperatures may be reached can have an adverse effect particularly if the catalyst is to be reactivated.

Accordingly, an improved method of deactivating or stabilizing an iron hydrogenation catalyst particularly suited for large-scale operations is desired.

STATEMENT OF THE INVENTION

This invention resides in the discovery that an iron hydrogenation catalyst can be stabilized toward pyrophoric behavior on exposure to an oxygen-containing gas by treating the iron catalyst while still at least partially active with an aqueous solution of a stabilizing agent of the group consisting of sorbitol, succinic acid and tetra(hydroxyethyl)ethylenediamine. The concentration of the stabilizing solution can be in the range of about 0.001 to about 5 weight percent, preferably in the range of 0.1 to 1.0 percent by weight. The quantity of stabilizing solution used is in the range of 0.5 to 100 grams of solution per gram of the iron catalyst to be stabilized, and preferably in the range of 2–10 grams of solution per gram of catalyst.

The treatment can be carried out at a temperature in the range of 0° C. to 200° C. and preferably in the range of 20–50° C. The stabilization can be carried out at atmospheric or superatmospheric pressure and generally in the range of 0–100 p.s.i.g. It is preferred that the treatment be carried out at atmospheric pressure.

The treatment is carried out over a period of time sufficient to wet the catalyst bed completely, thereby rendering the catalyst nonpyrophoric on drying. Generally the treatment time is for at least 0.05 hour and preferably for about 0.5 hour. The maximum time of treatment is not critical and can be as much as 50 hours or longer, but preferably no longer than about 5 hours.

A particular advantage of the process of this invention is that the stabilized iron catalyst can be washed substantially free of stabilizing agent with a liquid such as water and the iron catalyst can then again be activated by treating at a pressure of 0.01 to 70 atmospheres at a temperature in the range of about 300° C. to about 600° C. in an atmosphere of hydrogen or hydrogen containing from 0.001 to 10% by volume of ammonia. Alternately the stabilized catalyst can be washed with substantially anhydrous ammonia and used directly for further hydrogenation without the added reactivation treatment with hydrogen.

DESCRIPTION OF PREFERRED EMBODIMENTS

The examples to follow are intended to illustrate the present invention more fully but are not to be construed as limiting the scope thereof.

Example 1 illustrates the effectiveness of the sorbitol treatment in rendering the still active iron catalyst non-pyrophoric. Examples 2 and 3 illustrate the ability of the stabilized iron catalyst to be reactivated and used again in the hydrogenation of adiponitrile. Examples 4 and 5 illustrate the use of stabilizing agents other than sorbitol.

Example 1.—Deactivation of Iron Catalyst With Sorbitol Treatment (A) Test procedure: The test to determine if the catalyst sample was rendered nonpyrophoric or deactivated was carried out as follows. A small portion (about 10 grams) of the catalyst under test was placed on a sintered glass disc fused inside a one-inch diameter glass tube. By use of vacuum on the bottom of the glass tube, air was drawn downward through the catalyst at a rate of 100 ml./minute. The temperature of the catalyst layer was monitored by means of a thermocouple and recorder.

(B) Catalyst not treated: A sample of active iron hydrogenation catalyst, which had been removed from a reactor in which adiponitrile was continuously hydrogenated to hexamethylenediamine, was immersed in water for 24 hours and then placed in the test apparatus described above and air was drawn through the sample at 100 ml./minute. A significant temperature rise of the catalyst layer had occurred in 20 minutes, and in 38 minutes the temperature of the catalyst layer was above 200° C.

(C) Catalyst treated with sorbitol: Twenty gallons of 70% aqueous sorbitol solution was diluted in 200 gallons of water and thereafter circulated at a rate of 50 gallons per minute for three hours through a catalyst bed containing 12,000 pounds (expressed as oxide) of iron catalyst removed from a reactor for hydrogenating adiponitrile to hexamethylenediamine. The treated catalyst was allowed to stand immersed in the sorbitol solution for three days after which a sample was taken for test of deactivation in the apparatus described above. No increase in temperature was observed on drawing air through the sample for 30 minutes, by which time the catalyst sample was completely dry.

In another test an active iron catalyst, which had been prepared by activating a 1.41 lb. sample of iron oxide at 460° C. for 48 hours in a mixture of 12 s.c.f.h wet hydrogen (saturated at 100 p.s.i.g. and 30° C.), 3 s.c.f.h. dry hydrogen and 0.15 s.c.f.h. of ammonia and thereafter used for hydrogenating adiponitrile, was washed for 10 minutes with about 800 ml. of a 0.6% by weight aqueous sorbitol solution at 25° C. On draining the catalyst from the catalyst bed and discharging the treated catalyst into an open container in contact with air there was no evidence of an increase in temperature in the dry treated catalyst.

Example 2.—Reactivation of Stabilized Catalyst (Water Wash)

A 265 g. portion of 8–14 mesh iron oxide, consisting primarily of $Fe_3O_4$, wash charged into a stainless steel reactor of 1″ internal diameter and reduced for 85 hours with 100% hydrogen at about 450° C. Thereafter, the activated iron catalyst was treated with 300 ml. of 0.5 weight percent of aqueous sorbitol solution for one hour. The treated catalyst was then water washed, dried under vacuum at room temperature, crushed and sieved to 200–400 mesh. A 55 g. sample of the 200–400 mesh material was recharged to the reduction tube and treated with 100% hydrogen for 41 hours at about 450° C.

A batch hydrogenation was carried out in a one-liter stirred autoclave using 216 g. of adiponitrile, 216 g. ammonia and 20 g. of the catalyst reactivated as described above. The hydrogenation conducted at 150° C. and 5000 p.s.i.g. total pressure ($pH_2=3500$; $pNH_3+ADN=1500$) was complete in 121 minutes, having consumed the theoretical quantity of hydrogen, with a yield of 92.5% of hexamethylenediamine.

Example 3.—Reactivation of Stabilized Catalyst (Ammonia Wash)

This example illustrates that the stabilized iron catalyst can be restored to catalytic activity by subjecting the stabilized catalyst to an ammonia wash without further reactivation.

A 1.41 lb. sample of iron oxide, composed primarily of $Fe_2O_3$, was charged to a ⅞ inch diameter stainless steel fixed bed reactor. The oxide was activated at 420° C. and at a pressure of 100 p.s.i.g. with a gas mixture composed of 12 s.c.f.h. wet hydrogen (saturated at 100 p.s.i.g. and 30° C.), s.c.f.h. dry hydrogen and 0.15 s.c.f.h. of ammonia over a period of 48 hours.

With out removing the catalyst the same vessel was used to hydrogenate adiponitrile continuously at 4700 p.s.i.g. for 24 hours, using ammonia as solvent, an inlet temperature of 120° C., exit temperature 175° C., ammonia feed rate of 11 lb./hr., average adiponitrile feed rate of 1.03 lb./lb. catalyst/hr. and hydrogen make-up rate of 30 s.c.f.h. A sample taken during the course of the run showed a yield to hexamethylenediamine of 98.9%.

The reaction was discontinued, the catalyst bed was cooled to 25° C. and washed for one hour with 5 liters of a 0.6 weight percent sorbitol solution (56 g. sorbitol to 20 lb. water). The ctalyst bed was drained of liquid, the ammonia flow was resumed until the inlet temperature rose to 120° C. Hydrogenation was resumed at 4700 p.s.i.g. with an inlet temperature of 119° C., exit temperature of 176° C., ammonia feed rate 11 lb./hr., adiponitrile feed rate of 1.12 lb./lb. catalyst/hr. and average hydrogen make-up of 31.4 s.c.f.h. over a period of 12 hours. A sample taken during the run showed a yield to hexamethylenediamine of 98.9%.

The reaction was again discontinued, the catalyst bed was cooled to 25° C. and washed with 0.6 weight percent sorbitol solution at a rate of 5 liters/hr. for five minutes. Without washing the catalyst was dried with nitrogen, then activated for 48 hours at 460° C. with a gas stream of the composition as described above.

Hydrogenation of adiponitrile at 4700 p.s.i.g. was begun with inlet temperature of 123° C., exit temperature of 161° C., ammonia flow rate of 7.6 lb./hr., average adiponitrile feed rate of 0.85 lb./lb. catalyst/hr. and average hydrogen make-up of 24 s.c.f.h. A sample taken during the run which lasted about 48 hours showed a yield to hexamethylenediamine of 98.9%.

Example 4.—Succinic Acid as Stabilizer

A portion of the catalyst used in Example 1(B) was immersed in a 5 weight percent aqueous solution of succinic acid for 88 hours. On testing, as described in Example 1, it showed no temperature rise in 30 minutes.

Example 5—Tetra(hydroxyethyl)ethylenediamine as Stabilizer

Another portion of the catalyst used in Example 1(B) was immersed in a 0.5 weight percent aqueous solution of tetra(hydroxyethyl)ethylenediamine for one hour, then removed and tested as described in Example 1. There was no temperature rise in 48 minutes.

I claim:
1. A method of deactivating and rendering nonpyrophoric an iron hydrogenation catalyst which exhibits pyrophoric behavior on exposure to an oxygen-containing gas which comprises treating the catalyst with a 0.001 to 5 percent by weight aqueous solution of a stabilizing agent selected from the group consisting of sorbitol, succinic acid and tetra(hydroxyethyl)ethylenediamine, in an amount of 0.5 to 100 grams of solution per gram of catalyst, at a temperature in the range of 0° C. to 200° C. at a pressure of 0 to 100 p.s.i.g., for a time sufficient to completely wet the catalyst, separating the catalyst from the aqueous solution and drying the catalyst.

2. The method of Claim 1 wherein the treatment time is at least 0.05 hour.

3. The method of Claim 2 wherein the stabilizing agent is sorbitol.

4. The method of Claim 3 wherein the stabilized catalyst is washed with water to remove substantially the sorbitol and is thereafter reactivated by treatment with hydrogen at a pressure in the range of 0.01 to 70 atmospheres and at a temperature in the range of about 300° C. to about 600° C.

5. The method of Claim 4 wherein the hydrogen used in reactivation contains from 0.001 to 10 percent by weight volume of ammonia.

6. The method of Claim 3 wherein the stabilized catalyst is washed with substantially anhydrous ammonia to remove substantially the sorbitol, thereby to regain activity of the catalyst for hydrogenation of adiponitrile to hexamethylenediamine.

7. The method of Claim 1 wherein the concentration of aqueous solution of stabilizing agent is in the range of 0.1 to 1.0 percent by weight.

8. The method of Claim 1 wherein the stabilizing agent is succinic acid.

9. The method of Claim 1 wherein the stabilizing agent is tetra(hydroxyethyl)ethylenediamine.

References Cited

UNITED STATES PATENTS

| | | | |
|---|---|---|---|
| 2,781,325 | 2/1957 | Rottig | 252—472 |
| 3,379,635 | 4/1968 | Von Doehren et al. | 252—477 Q |
| 3,591,522 | 7/1971 | Cosyns et al. | 252—411 R |
| 3,032,515 | 5/1962 | Hinsvark | 252—477 Q |

DANIEL E. WYMAN, Primary Examiner

W. J. SHINE, Assistant Examiner

U.S. Cl. X.R.

252—477 Q, 403, 407